United States Patent
Chang

(10) Patent No.: US 6,786,846 B2
(45) Date of Patent: Sep. 7, 2004

(54) SAFETY DEVICE FOR A REMOTELY-ACTIVATED POWER SUPPLYING SYSTEM OF A MANUAL TRANSMISSION VEHICLE

(75) Inventor: Apin Chang, Chung-Ho (TW)

(73) Assignee: Wintecronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/299,278

(22) Filed: Nov. 19, 2002

(65) Prior Publication Data

US 2004/0097329 A1 May 20, 2004

(51) Int. Cl.⁷ ............................ F02N 11/08; B60K 28/10
(52) U.S. Cl. ..................... 477/99; 477/183; 180/167; 123/179.2; 307/10.6
(58) Field of Search ................ 477/99, 183; 123/179.2; 307/10.6; 180/167

(56) References Cited

U.S. PATENT DOCUMENTS 3,054,904 A * 9/1962 Fuciarelli .................. 290/37 R
4,674,454 A * 6/1987 Phairr ....................... 123/179.2
5,042,439 A * 8/1991 Tholl et al. ............... 123/179.2
5,656,868 A * 8/1997 Gottlieb et al. ............. 307/10.6
5,757,086 A * 5/1998 Nagashima ................. 307/10.6

FOREIGN PATENT DOCUMENTS

JP        2001-180328 A * 7/2003 ........... B60K/28/10

* cited by examiner

Primary Examiner—Richard M. Lorence
(74) Attorney, Agent, or Firm—Webb Ziesenheim Logsdon Orkin & Hanson P.C.

(57) ABSTRACT

A safety device for a remotely-activated power supplying system of a manual transmission vehicle includes a starting safety unit connected to a main controller for detecting the presence of a safety condition, and an ignition key detector connected to the main controller for detecting if an ignition key is uprooted from a key-operated power supplying system. Thus, the main controller can be configured to activate a power supplying device to supply electric power to an ignition system when a wirelessly transmitted start signal is received by the main controller, when the safety condition is detected by the starting safety unit, and when the ignition key detector detects that the ignition key is uprooted.

4 Claims, 2 Drawing Sheets

FIG. 3

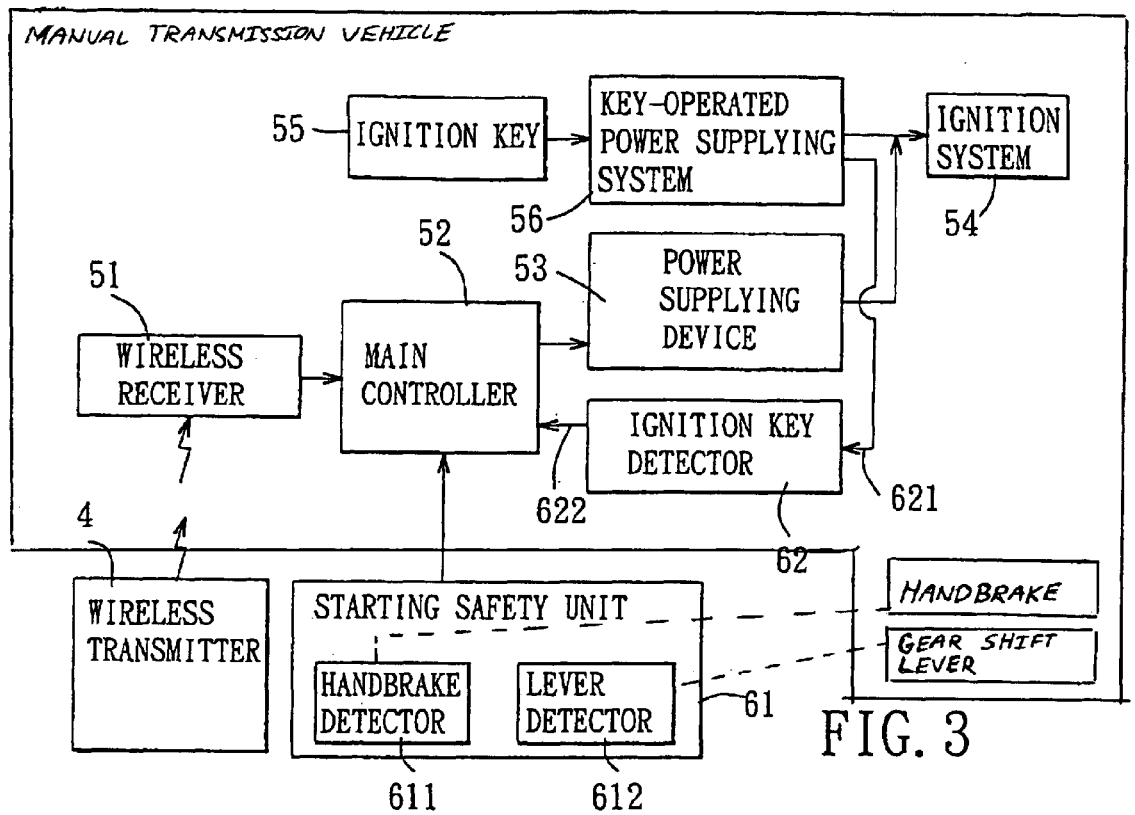
FIG. 3
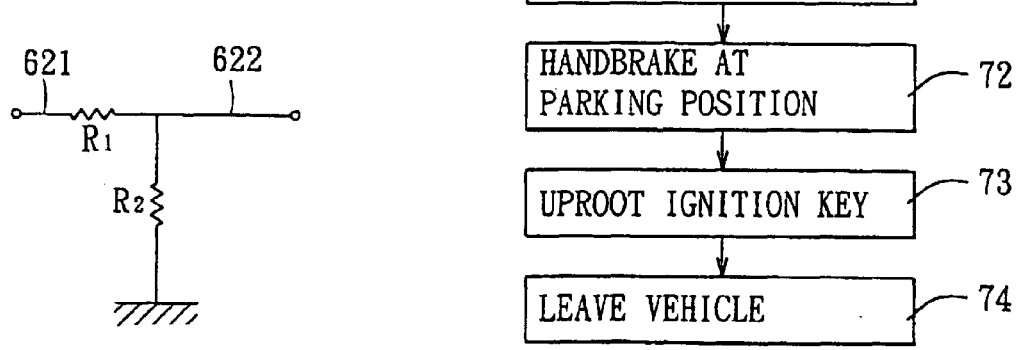
FIG. 4
FIG. 5

SAFETY DEVICE FOR A REMOTELY-ACTIVATED POWER SUPPLYING SYSTEM OF A MANUAL TRANSMISSION VEHICLE

BACKGROUND OF THE INVENTION

1. Field of the Invention

The invention relates to a safety device for a remotely-activated power supplying system of a manual transmission vehicle, more particularly to a safety device including a starting safety unit and an ignition key detector.

2. Description of the Related Art

FIG. 1 is a schematic circuit block diagram of a vehicle that incorporates a conventional remotely activated power supplying system. The vehicle includes a key-operated power supplying system 17 capable of being activated through an ignition key 18, an ignition system 14 connected electrically to the key-operated power supplying system 17, a handbrake (not shown), and a gear shift lever (not shown). The remotely-activated power supplying system includes a power supplying device 11 connected to the ignition system 14, a main controller 13 connected to the power supplying device 11, a wireless receiver 12 connected to the main controller 13, a wireless transmitter 2 provided with a start key 21 that is operable so as to enable the wireless transmitter 2 to transmit a start signal to be received by the main controller 13 through the wireless receiver 12, and a starting safety unit 15 connected to the main controller 13 for detecting the presence of a safety condition.

The purpose of the remotely-activated power supplying system is to remotely start the vehicle at a distance before the driver enters the vehicle so as to save warm-up waiting time before driving the vehicle. In view of safety concerns, such as preventing accidents caused by inappropriate triggering of the remote transmitter 2, the starting safety unit 15 is provided to enable the main controller 13 to activate the power supplying device 11 to permit the supply of electric power to the ignition system 14 only when the start signal transmitted by the remote controller 2 and a safety signal generated by the starting safety unit 15 are received by the main controller 13.

In the case of an automatic transmission vehicle, the starting safety unit 15 includes a lever detector for detecting the position of the gear shift lever. The starting safety unit 15 generates the safety signal only when the gear shift lever is disposed at a neutral gear (e.g., N gear or P gear) position. Accordingly, if the vehicle was incorrectly parked, such as with the gear shift lever disposed at a drive gear (D gear) or a reverse gear (R gear) position, the starting safety unit 15 will not generate the safety signal, and remote activation of the power supplying device 11 will not be possible.

In the case of a manual transmission vehicle, three different implementations of the starting safety unit 15 are currently available:

1. The starting safety unit includes a handbrake detector for detecting the position of the handbrake. Particularly, when the handbrake is lifted to a parking position, the handbrake detector will activate a handbrake indicator on the instrument panel of the vehicle. At the same time, the safety signal will be generated to enable remote activation of the power supplying device 11 by the main controller 13. However, it is possible that the handbrake may be erroneously judged by the handbrake detector to be at the parking position even though it is only partly lifted. This problem is further aggravated by wearing of the brake disc.

2. The starting safety unit includes a lever detector for detecting the position of the gear shift lever. Particularly, when the gear shift lever is disposed at the neutral gear position, the safety signal will be generated to enable remote activation of the power supplying device 11 by the main controller 13. However, the lever detector is not a standard accessory of a manual transmission vehicle. Aside from the problem of difficulty in installation, errors can occur when the lever detector is improperly installed.

3. Aside from the aforesaid handbrake detector or lever detector, a "manual operation procedure" is enforced to ensure that remote starting of the vehicle is possible only when the latter is properly parked. Referring to FIG. 2, the conventional "manual operation procedure" is shown to include the following five steps:

a. The gear shift lever is disposed at the neutral gear position (step 31);
  b. The handbrake is lifted to the parking position (step 32);
  c. A start switch 16 (see FIG. 1) or the start key 21 on the wireless transmitter 2 is operated to activate the power supplying system 17 or the power supplying device 11 so as to permit idle running of the vehicle engine for a preset time period (such as several minutes) (step 33);
  d. The ignition key 18 is uprooted from the power supplying system 17, and the engine continues to run idly due to operation of the start switch 16 or the start key 21 in step 33 (step 34); and
  e. The driver leaves the vehicle, and the engine stops running shortly after the vehicle doors are closed (step 35).

Only when the foregoing "manual operation procedure" is properly conducted will remote starting of the vehicle be possible. Hence, after conducting the "manual operation procedure," when the driver operates the wireless transmitter 2 in order to warm up the vehicle, the start signal will be received by the main controller 13 through the wireless receiver 12. Thereafter, only when the main controller 13 receives the safety signal from the starting safety unit 15 will the main controller 13 be able to activate the power supplying device 11 for providing electric power to the ignition system 14 to start the vehicle.

From the foregoing description, it is evident that the third implementation of the starting safety unit 15 is the safest and most reliable for application to manual transmission vehicles. However, the "manual operation procedure" involved therein is rather inconvenient when put into actual practice. Particularly, each time the driver intends to leave the vehicle, the step of operating the start switch 16 or the start key 21 on the wireless transmitter 2, i.e., step 33, has to be executed, which is rather troublesome when the driver has to get in and out of the vehicle frequently. Moreover, if the driver forgets to perform this action before getting off the vehicle, the remote start function will not work.

SUMMARY OF THE INVENTION

Therefore, the object of the present invention is to provide a safety device for a remotely-activated power supplying system of a manual transmission vehicle that can overcome the aforesaid drawbacks associated with the prior art.

According to the present invention, there is provided a safety device for a remotely-activated power supplying system of a manual transmission vehicle. The manual transmission vehicle includes a key-operated power supplying system capable of being activated through an ignition key, an ignition system connected electrically to the key-operated power supplying system, a handbrake, and a gear shift lever. The remotely-activated power supplying system includes a power supplying device to be connected to the ignition system, a main controller connected to the power supplying device, a wireless receiver connected to the main controller, and a wireless transmitter operable so as to transmit a start signal to be received by the main controller through the wireless receiver. The safety device comprises:

a starting safety unit adapted to be connected to the main controller for detecting presence of a safety condition, the starting safety unit including at least one of a handbrake detector adapted to detect position of the handbrake, and a lever detector adapted to detect position of the gear shift lever, the safety condition being at least one of the handbrake being disposed at a parking position and the gearshift lever being disposed at a neutral gear position; and an ignition key detector adapted to be connected to the main controller and adapted to detect if the ignition key is uprooted from the key-operated power supplying system.

Therefore, the main controller can be configured to activate the power supplying device to permit supply of electric power to the ignition system for a preset time period when the start signal is transmitted by the wireless transmitter and is received by the main controller through the wireless receiver, when the safety condition is detected by the starting safety unit, and when the ignition key detector detects that the ignition key is uprooted from the key-operated power supplying system.

BRIEF DESCRIPTION OF THE DRAWINGS

Other features and advantages of the present invention will become apparent in the following detailed description of the preferred embodiment with reference to the accompanying drawings, of which:

FIG. 3 is a schematic circuit block diagram of a manual transmission vehicle that incorporates a remotely-activated power supplying system and the preferred embodiment of a safety device according to this invention;

FIG. 4 is a schematic electrical circuit diagram of an ignition key detector of the preferred embodiment; and FIG. 5 is a flowchart illustrating a "manual operation procedure" implemented in the system of FIG. 3.

DETAILED DESCRIPTION OF THE PREFERRED EMBODIMENT

Figure 1:
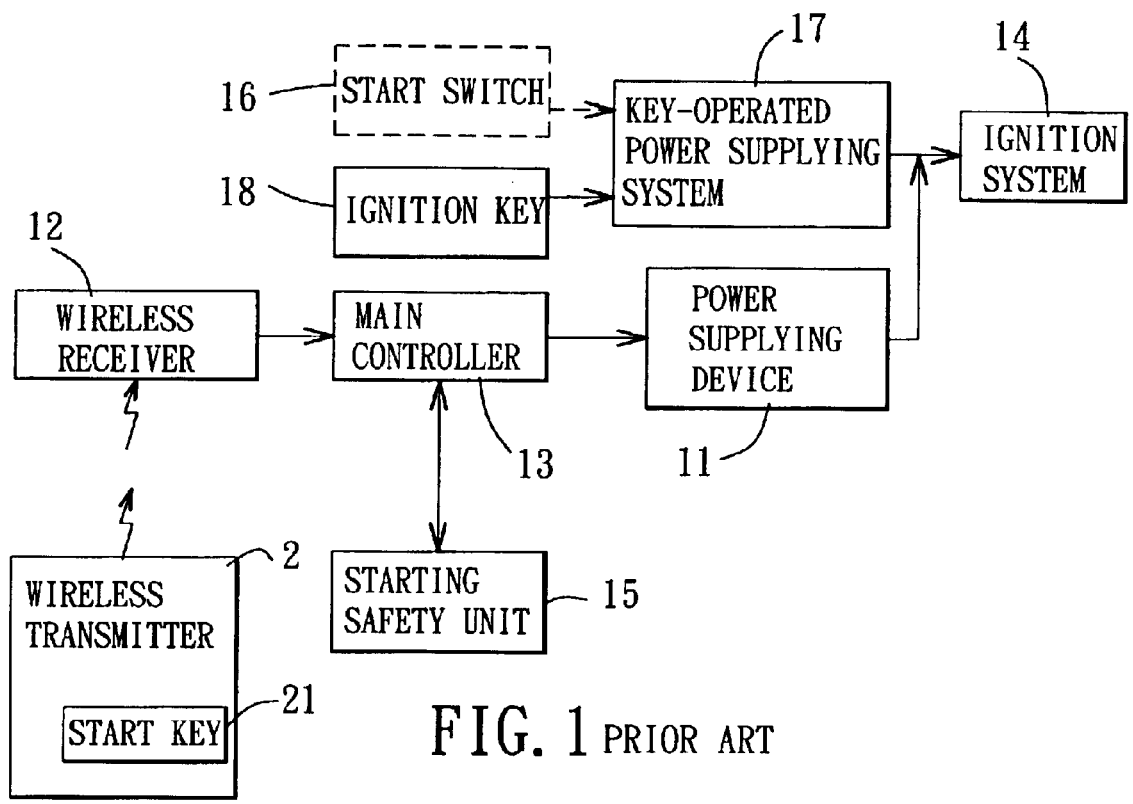
FIG. 1 is a schematic circuit block diagram of a vehicle that incorporates a conventional remotely-activated power supplying system.

Referring to FIG. 3, the preferred embodiment of a safety device according to the present invention is shown to be used in combination with a remotely-activated power supplying system of a manual transmission vehicle. The vehicle includes a known key-operated power supplying system 56 capable of being activated through an ignition key 55, a known ignition system 54 connected electrically to the key-operated power supplying system 56, a handbrake (not shown), and a gear shift lever (not shown). The remotely-activated power supplying system includes a power supplying device 53 to be connected to the ignition system 54, a main controller 52 connected to the power supplying device 53, a wireless receiver 51 connected to the main controller 52, and a wireless transmitter 4 operable so as to transmit a start signal to be received by the main controller 52 through the wireless receiver 51. The safety device includes a starting safety unit 61 adapted to be connected to the main controller 52 for detecting presence of a safety condition, and an ignition key detector 62 adapted to be connected to the main controller 52 and adapted to detect if the ignition key 55 is uprooted from the key-operated power supplying system 56.

The starting safety unit 61 includes at least one of a known handbrake detector 611 that is adapted to detect the position of the handbrake, and a known lever detector 612 that is adapted to detect the position of the gear shift lever. Accordingly, the safety condition is at least one of the handbrake being disposed at a parking position, and the gear shift lever being disposed at a neutral gear position.

Referring to FIG. 4, the ignition key detector 62 includes a voltage dividing circuit having an input end 621 and an output end 622. The voltage dividing circuit includes a first resistor (R1) having opposite terminals connected to the input end 621 and the output end 622, respectively, and a second resistor (R2) having a first terminal connected to the output end 622 and a grounded second terminal. The input end 621 is adapted to be connected to the key-operated power supplying system 56. The output end 622 is adapted to be connected to the main controller 52. When the ignition key 55 is uprooted from the key-operated power supplying system 56, a low level voltage is outputted to the ignition key detector 62, and the ignition key detector 62 sends a signal that indicates a deactivated status of the key-operated power supplying system 56 to the main controller 52. Therefore, the main controller 52 can be configured to activate the power supplying device 53 to permit the supply of electric power to the ignition system 54 for a preset time period when the start signal is transmitted by the wireless transmitter 4 and is received by the main controller 52 through the wireless receiver 51, when the safety condition is detected by the starting safety unit 61, and when the ignition key detector 62 detects that the ignition key 55 is uprooted from the key-operated power supplying system 56.

Like the prior art described in the foregoing, the driver has to execute a "manual operation procedure" before leaving the vehicle. The purpose of the "manual operation procedure" is to ensure that remote starting of the vehicle is possible only when the latter is properly parked, i.e., the handbrake is disposed at the proper parking position and/or the gear shift lever is disposed at the neutral gear position. Referring to FIG. 5, the "manual operation procedure" implemented in the system of FIG. 3 is shown to include only the following four steps:

i. The gear shift lever is disposed at the neutral gear position (step 71);

ii. The handbrake is lifted to the parking position (step 72);

iii. The ignition key 55 is uprooted from the power supplying system 56. At this time, the ignition key detector 62 indicates the deactivated status of the key-operated power supplying system 56 to the main controller 52, and the main controller 52 responds by activating the power supplying device 53 so as to permit idle running of the vehicle engine for a preset time period (such as several minutes) (step 73); and iv. The driver leaves the vehicle, and the engine stops running shortly after the vehicle doors are closed (step 74).

Figure 2:
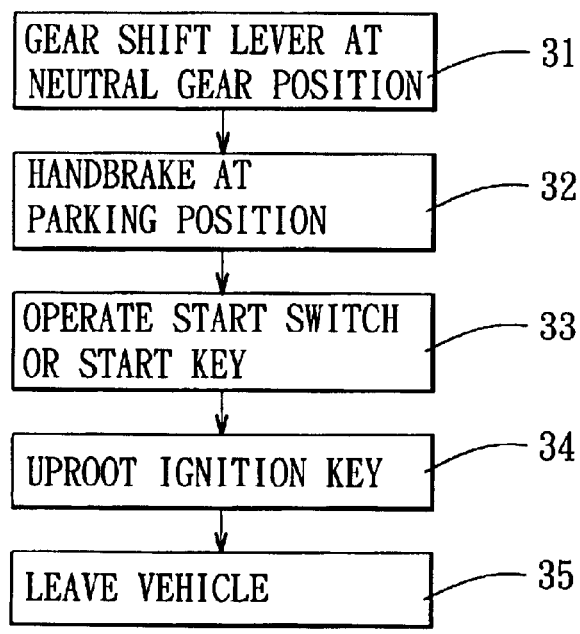
FIG. 2 is a flowchart illustrating a "manual operation procedure" for a starting safety unit implemented in the system of FIG. 1.

As compared to the flowchart shown in FIG. 2, the "manual operation procedure" in the system that implements the safety device of this invention dispenses with the need to operate a start switch or a start key prior to leaving the vehicle. The object of this invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A safety device for a remotely-activated power supplying system of a manual transmission vehicle, the manual transmission vehicle including a key-operated power supplying system capable of being activated through an ignition key, an ignition system connected electrically to the key-operated power supplying system, a handbrake, and a gear shift lever, the remotely-activated power supplying system including a power supplying device to be connected to the ignition system, a main controller connected to the power supplying device, a wireless receiver connected to the main controller, and a wireless transmitter operable so as to transmit a start signal to be received by the main controller through the wireless receiver, said safety device comprising:

a starting safety unit adapted to be connected to the main controller for detecting presence of a safety condition, said starting safety unit including at least one of a handbrake detector adapted to detect position of the handbrake, and a lever detector adapted to detect position of the gear shift lever, the safety condition being at least one of the handbrake being disposed at a parking position and the gear shift lever being disposed at a neutral gear position, an ignition key detector adapted to be connected to the main controller and adapted to detect if the ignition key is uprooted from the key-operated power supplying system, wherein said ignition key detector has an input adapted to be connected to the key-operated power supplying system, and an output adapted to be connected to the main controller, said ignition key detector being adapted to indicate a deactivated status of the key-operated power supplying system to the main controller when the ignition key is uprooted from the key-operated power supplying system, further wherein said ignition key detector includes a voltage dividing circuit, said voltage dividing circuit including a first resistor having opposite terminals connected to said input and said output, respectively, and a second resistor having a first terminal connected to said output and a grounded second terminal, and whereby, the main controller is configured to activate the power supplying device to permit supply of electric power to the ignition system for a preset time period when the start signal is transmitted by the wireless transmitter and is received by the main controller through the wireless receiver, when the safety condition is detected by said starting safety unit, and when said ignition key detector detects that the ignition key is uprooted from the key-operated power supplying system.

2. A remotely-activated power supplying system for a manual transmission vehicle, the manual transmission vehicle including a key-operated power supplying system capable of being activated through an ignition key, an ignition system connected electrically to the key-operated power supplying system, a handbrake, and a gear shift lever, said remotely-activated power supplying system comprising:

a power supplying device adapted to be connected to the ignition system;

a main controller connected to said power supplying device;

a wireless receiver connected to said main controller;

a wireless transmitter operable so as to transmit a start signal to be received by said main controller through said wireless receiver;

a starting safety unit connected to said main controller for detecting presence of a safety condition, said starting safety unit including at least one of a handbrake detector adapted to detect position of the handbrake, and a lever detector adapted to detect position of the gear shift lever, the safety condition being at least one of the handbrake being disposed at a parking position and the gear shift lever being disposed at a neutral gear position; and an ignition key detector connected to said main controller and adapted to detect if the ignition key is uprooted from the key-operated power supplying system;

said main controller being configured to activate said power supplying device to permit supply of electric power to the ignition system for a preset time period when the start signal is transmitted by said wireless transmitter and is received by said main controller through said wireless receiver, when the safety condition is detected by said starting safety unit, and when said ignition key detector detects that the ignition key is uprooted from the key-operated power supplying system.

3. The remotely-activated power supplying system of claim 2, wherein said ignition key detector has an input adapted to be connected to the key-operated power supplying system, and an output connected to said main controller, said ignition key detector being adapted to indicate a deactivated status of the key-operated power supplying system to said main controller when the ignition key is uprooted from the key-operated power supplying system.

4. The remotely-activated power supplying system of claim 3, wherein said ignition key detector includes a voltage dividing circuit, said voltage dividing circuit including a first resistor having opposite terminals connected to said input and said output, respectively, and a second resistor having a first terminal connected to said output and a grounded second terminal.

* * * * *